Feb. 10, 1970 C. J. KRUGER 3,494,489
ASSEMBLY FOR ADJUSTING THE POSITION OF A LOAD HANDLING
DEVICE MOUNTED ON A VEHICLE
Filed Jan. 9, 1968
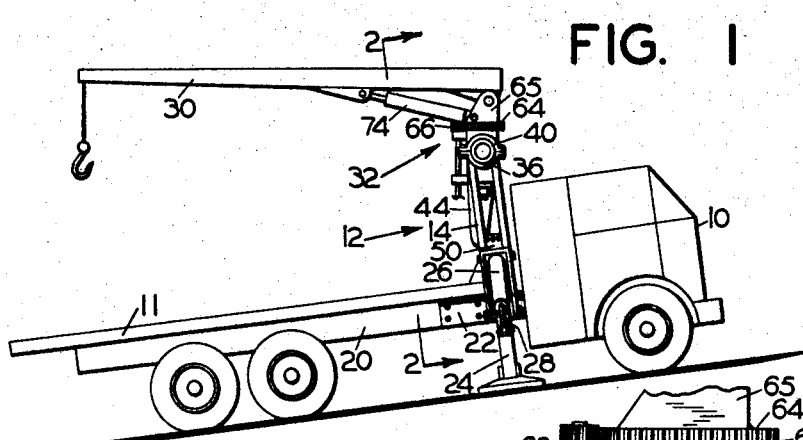
FIG. 1
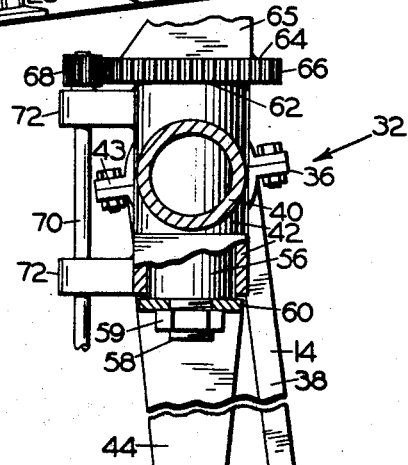
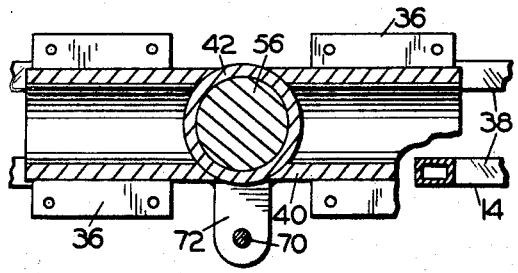
FIG. 4
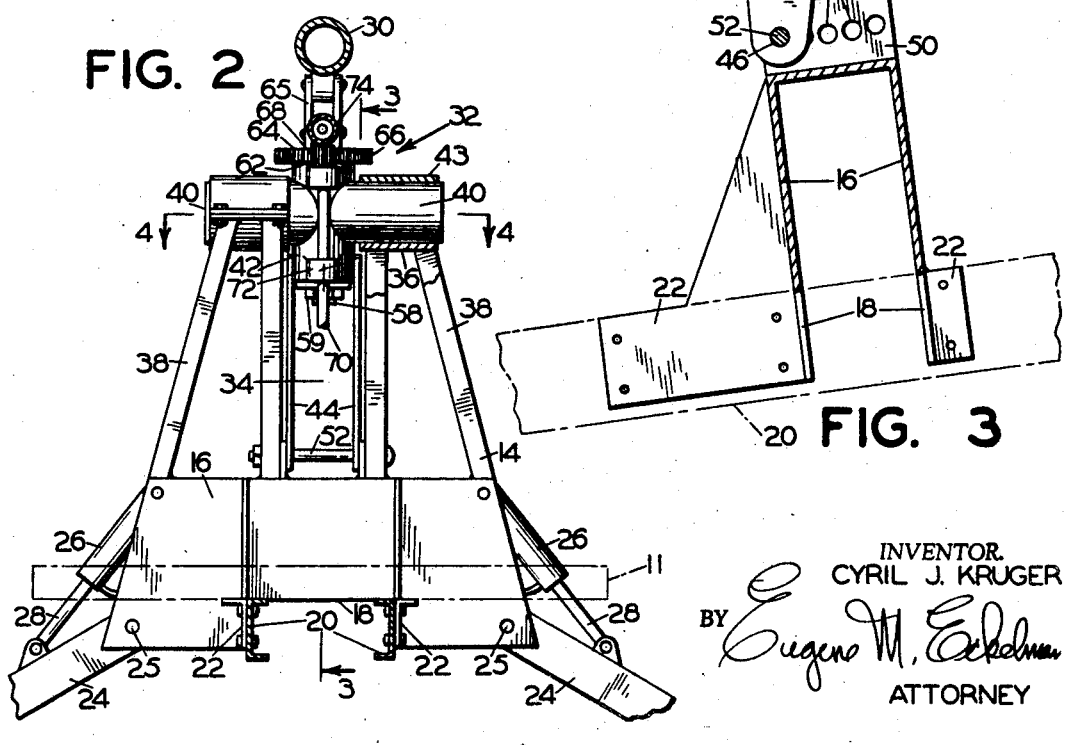
FIG. 2
FIG. 3
INVENTOR.
CYRIL J. KRUGER
BY
ATTORNEY

United States Patent Office 3,494,489
Patented Feb. 10, 1970

3,494,489
ASSEMBLY FOR ADJUSTING THE POSITION OF A LOAD HANDLING DEVICE MOUNTED ON A VEHICLE
Cyril J. Kruger, P.O. Box 506, Corvallis, Oreg. 97330
Filed Jan. 9, 1968, Ser. No. 696,531
Int. Cl. B60p 1/46; B66c 23/06
U.S. Cl. 214—75                                    1 Claim

ABSTRACT OF THE DISCLOSURE

An upright support is adapted to be secured to a vehicle and has a hub on its upper end. Rotatably supported on the hub is a spindle to which is connected a power operated boom for swinging a load onto the vehicle. The spindle has an upright axis of rotation on the hub and has a flat rotatable bearing engagement with the hub. The hub is pivotally adjustable on the upright support in a direction longitudinally of the vehicle and has integral depending arms capable of being locked in varying positions of longitudinal pivotal adjustment by latch means on the arms and the support, whereby to level the bearing surface when the vehicle is longitudinally inclined.

---

This invention relates to new and useful improvements in vehicle mounted loading apparatus.

Vehicle mounted loading apparatuses are of common usage, and in general each employs an upright support on which a boom is rotatably mounted. The boom is rotatable on an upright axis such that its bearing surface is substantially parallel with the vehicle frame. To perform safely and with greatest efficiency, the loader should be operated on level ground. A slight slope can severely limit the effectiveness of a loader of this type when handling heavy materials either when loading or unloading since the capacity is reduced and precise control is much more difficult when the bearing surface between the boom and the support is not horizontal. Most vehicles having loading apparatus thereon employ side stabilizers which level the vehicle sideways and provide side support and which of course can be used to level the mentioned bearing surface laterally. No simplified means has heretofore been employed, however, to level the bearing surface longitudinally of the vehicle, as when the vehicle faces up or down an incline.

The same difficulty in loading is encountered when the vehicle is on a longitudinal incline as when it is on a lateral incline, and accordingly, it is a primary objective of the present invention to provide a vehicle mounted loading apparatus of the type described having a simplified structural arrangement for leveling the rotative bearing surface between the boom and the boom support in a direction longitudinally of the vehicle.

Another object of the present invention is to provide a vehicle mounted loading apparatus having a support and also having a hub thereon adapted to receive a spindle to which a boom is connected and adapted for adjustable pivotal movement longitudinally of the vehicle for adjusting the bearing surface for the boom to a horizontal plane in said longitudinal direction, and more particularly to provide such an apparatus wherein said hub has depending arm means having a plurality of latched positions with the support to locate the hub in a selected position to level the said bearing surface longitudinally.

Still another object is to provide a vehicle mounted loading apparatus of the type described having means for leveling a rotatable bearing surface between a boom and boom support in a direction longitudinally of the vehicle and used in combination with side stabilizers for the vehicle which level said rotatable bearing surface in a direction extending laterally of the vehicle, for accomplishing efficient loading.

The invention will be better understood and additional objects and advantages will become apparent from the following description taken in connection with the accompanying drawings which illustrate a preferred form of the device.

In the drawings:

FIGURE 1 is a side elevational view of a vehicle having loading apparatus mounted thereon which embodies the instant invention;

FIGURE 2 is a vertical sectional view taken on the line 2—2 of FIGURE 1, this view being partly broken away and being enlarged relative to FIGURE 1;

FIGURE 3 is a vertical sectional view taken on the line 3—3 of FIGURE 2, this view also being enlarged relative to FIGURE 2 and being partly broken away; and FIGURE 4 is an enlarged horizontal sectional view taken on the line 4—4 of FIGURE 2.

With reference first to FIGURE 1, the numeral 10 designates a hauling vehicle such as a truck having a flat bed 11, and the numeral 12 designates a loading apparatus capable of moving a load onto and off the vehicle. The loading apparatus may either be mounted directly behind the cab of the vehicle as illustrated, or if desired it may be mounted adjacent the rearward end, or elsewhere, depending upon the type of vehicle employed as well as the type of merchandise to be carried by the vehicle.

In the usual construction there is employed a boom support 14 which is secured in upright, laterally extending position on the vehicle. For securing the support to the vehicle it includes a bottom channel-shaped base or stabilizer housing 16 having longitudinally aligned central notches 18 therein for straddling a longitudinal frame 20 of the vehicle, FIGURES 1 and 2. Angular mounting plates 22 are integrated, such as by welding, to the base 16 and the vehicle frame for securing the boom support to the vehicle.

Also associated with the boom support 14 are side stabilizers which are adapted to be lowered to the ground on either side of the vehicle and act as braces to prevent the vehicle from tipping when a load is swung out over its side. The stabilizers may also be used to level the vehicle when one side is on higher ground than the other. Such stabilizers are of conventional construction, comprising leg members 24 pivotally attached to the vehicle frame or to the boom support by pivot pin means 25. If connected to the base 16, the legs are pivotally attached between the walls of the channel-shaped base 16 by means of the pins 25. The stabilizers 24 are operated by suitable means, such as by double acting, fluid operated cylinders 26 pivotally connected at their upper ends to the boom support 14 and pivotally connected, by means of their extending piston rod 28, to the leg members 24. It is apparent that by suitable individual operation of the two cylinders 28 the vehicle can be stabilized laterally or further yet can be leveled sideways.

The boom portion 30 is of conventional construction. It has rotatable support on the boom support 14 by rotative means designated generally by the numeral 32 and comprising a principal part of the invention, now to be described.

In conventional vehicle mounted loading apparatuses, the connection between the boom and the boom support comprises a pivot support on an upright axis wherein a bearing support between the boom and the boom support is parallel with the vehicle frame. The best control and efficiency of the boom is accomplished when the bearing support is horizontal as mentioned hereinbefore. However, when the truck is supported on an incline in its longitudinal direction, or in other words when it faces up or down hill, the bearing surface between the boom and boom support is not level and the boom requires much greater power to swing a load in a direction such that the bearing support operates on an upward incline. In accordance with the present invention, the boom support 14 has a central vertical opening 34, FIGURE 2, and terminates at its upper end in pillow blocks 36 located on each side of the opening. To provide a rugged, lightweight structure, and one having a central opening 34, such support may be formed of a plurality of upstanding frame members 38 integrated with the base 16 and the pillow blocks 36. The boom support 14 is widened at the bottom with relation to the top in an A-frame type structure.

Seated pivotally in the pillow blocks 36 are trunnions 40 which have a spindle hub 42 integrated between them. Pillow blocks 36 have caps 43 which hold the trunnions in place but which allow pivotal movement of said trunnions therein. Also integrated with the trunnions as well as with the spindle hub is a depending pair of adjustment arms 44, one on each side of the hub. The spindle hub 42 and the arms 44 are disposed in the central opening 34 of the boom support 14, and the arms are elongated to extend to the lower end of the boom support. The arms 44 are each provided with an aperture 46 adjacent the bottom end thereof adapted for alignment with a series of apertures 48 in bottom plates 50 secured to the boom support adjacent the lower end thereof. Latch pin 52 is adapted for removable connection in aligned apertures 46 and 48, whereby it will be apparent that upon selected latch positions of the arms with apertures 46 the hub may be pivotally adjusted in a direction extending longitudinally of the vehicle.

Spindle hub 42 rotatably receives a spindle 56, FIGURE 3, and spindle 56 has a lower threaded shank 58 adapted to receive a lock nut 59 or the like for holding the spindle in the hub 42. Preferably, the spindle projects a fraction of an inch below the bottom of the hub and a washer 60 is clamped on the lower end of the spindle by the nut 59, thus providing a rotatable but securely connected joint. The upper end of the hub 42 has a flat surface 62 which forms a bearing support or seat for a flange 64 on the upper portion of the spindle 56.

The base end of the boom 30 is connected to the spindle 56 by means of upstanding ears 65 on the upper end of said spindle. The spindle and boom have powered rotation by any suitable means. For this purpose the flange 64 may have peripheral gear teeth 66 and be driven by a pinion gear 68, FIGURES 2 and 3, secured on an upright power driven shaft 70 having journaled support in ears 72 on the hub 42. Also, the boom may be operated in a vertical plane by suitable means, such as by a fluid-operated cylinder 74.

As explained hereinbefore, it is preferred that the bearing surface between the boom support and the boom, namely, the upper end 62 of the hub, be horizontal when a load is being lifted onto or off the vehicle. When the vehicle is parked on horizontal ground, the depending arms 44 of the spindle hub may be latched centrally to a suitable aperture 48 in the boom support to position the bearing surface 62 parallel with the track frame. However, if the vehicle is parked on an incline with relation to its longitudinal dimension, the latch pin 52 may be removed and the depending arms 44 pivoted with their trunnion support to adjust the bearing surface 62 to a horizontal position. With said bearing surface 62 disposed in a horizontal plane, a maximum loading efficiency can be performed with the boom. Thus, a high output loading and unloading is possible, and furthermore loading and unloading can be accomplished on terrain that otherwise would prevent loading or unloading. The stabilizers are used to level the bearing surface extending laterally of the vehicle.

It is to be understood that the form of my invention herein shown and described is to be taken as a preferred example of the same and that various changes in the shape, size and arrangement of parts may be resorted to without departing from the spirit of my invention.

Having thus described my invention, I claim:

1. Load handling apparatus comprising:
   (a) a vehicle, a base with means arranged to be secured to said vehicle in a laterally extending relation,
   (b) a pair of upright frame members integral with said base and spaced laterally to define an opening therebetween extending downwardly from the upper end thereof,
   (c) support means on the upper ends of each of said frame,
   (d) a hub extending down through said opening,
   (e) laterally projecting trunnion means on said hub rotatably seated on said support means and arranged to permit pivotal adjustable movement of said hub relative to said frame in a direction longitudinally of the vehicle,
   (f) a spindle rotatable in said hub,
   (g) said hub and spindle having flat bearing surfaces therebetween,
   (h) elongated boom with power operated load engaging and lifting means mounted on said spindle,
   (i) at least one arm attached to said hub and extending downwardly therefrom in said opening and arranged for rotation with said hub to adjust the flat bearing surfaces of the hub and spindle to a horizontal position,
   (j) a series of horizontally rectilinearly aligned openings in said frame members and a laterally extending pin interengageable between said arm and at least one of said openings in said frame members to hold said arm in a fixed position relative to said frame and to support a portion of the load of the power operated load engaging and lifting means,
   (k) said pin having a plurality of longitudinally interengaging positions between said arm and said frame members whereby said flat bearing surfaces of said hub and spindle are arranged to be adjusted to a horizontal plane when the vehicle is longitudinally inclined,
   (l) a pair of power operated leg members secured to respective ends of said base and arranged to engage the ground, said leg members being individually extendable vertically for leveling the said base relative to the ground.

References Cited

UNITED STATES PATENTS

| 2,645,360 | 7/1953 | Raymond. |
| 2,755,943 | 7/1956 | Payne et al. |
| 2,798,622 | 7/1957 | Kelley et al. |
| 3,011,652 | 12/1961 | Falk et al. |
| 3,113,681 | 12/1963 | Crile. |
| 3,282,450 | 11/1966 | Atcheson. |

FOREIGN PATENTS

| 162,748 | 5/1955 | Great Britain. |

GERALD M. FORLENZA, Primary Examiner

RAYMOND B. JOHNSON, Assistant Examiner

U.S. Cl. X.R.

212—59